Figure 1:
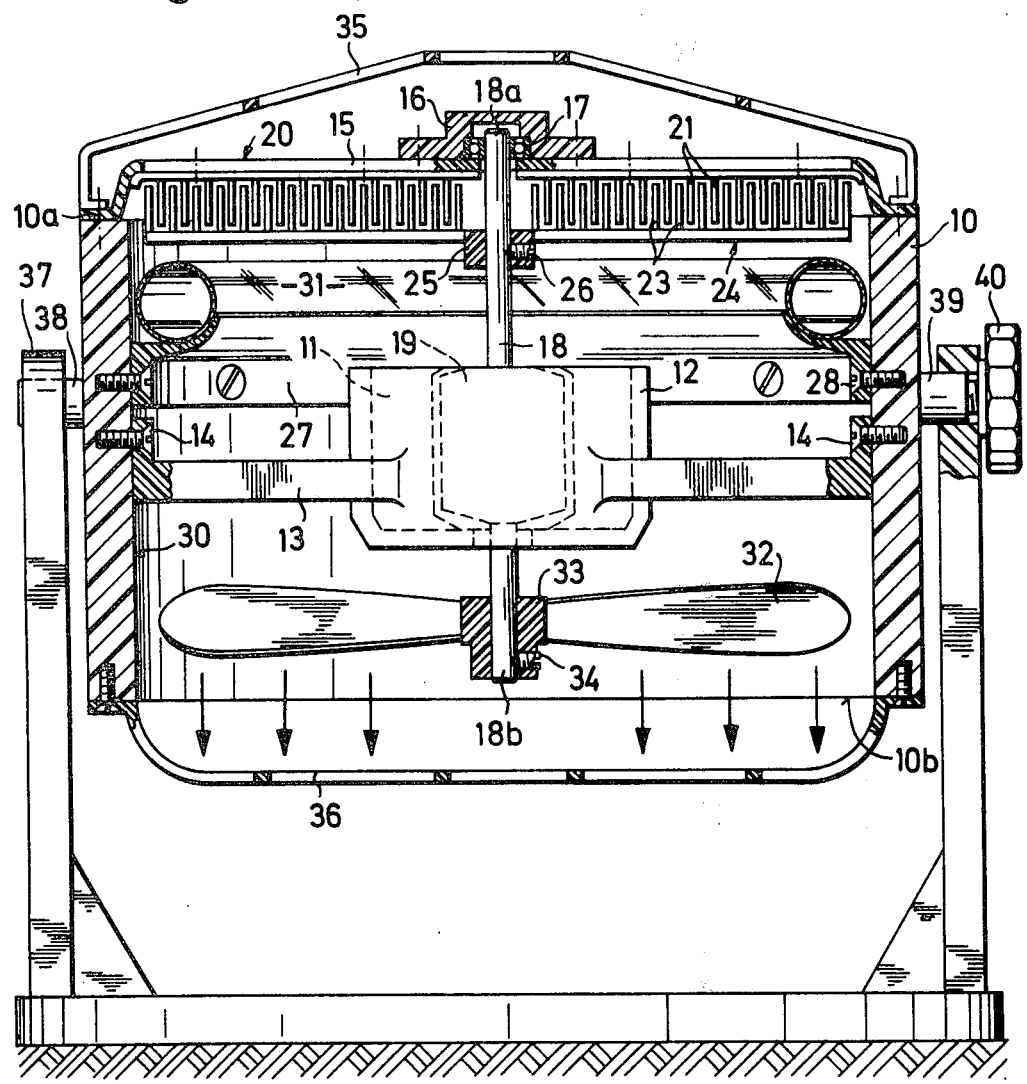

United States Patent
Rueff

[11] 3,987,578
[45] Oct. 26, 1976

[54] DEVICE FOR THE DESTRUCTION OF FLYING INSECTS, ESPECIALLY IN CLOSED ROOMS

[76] Inventor: Claude Rueff, Av.Alte.Barroso, 63 - grupo 2113, 20.000 Rio de Janeiro R.J., Brazil

[22] Filed: Aug. 1, 1975

[21] Appl. No.: 601,568

[30] Foreign Application Priority Data
Aug. 5, 1974  Switzerland........................ 21040/74

[52] U.S. Cl......................................... 43/139; 43/113
[51] Int. Cl.²............................................ A01M 1/06
[58] Field of Search ............... 43/138, 139, 140, 113

[56] References Cited
UNITED STATES PATENTS

| | | | |
|---|---|---|---|
| 2,340,944 | 2/1944 | Easter | 43/139 |
| 2,778,150 | 1/1957 | Pohlman | 43/139 |
| 2,799,117 | 7/1957 | Stokes | 43/113 |
| 3,123,933 | 3/1964 | Roche | 43/139 |

*Primary Examiner*—Warner H. Camp
*Attorney, Agent, or Firm*—Sughrue, Rothwell, Mion, Zinn & Macpeak

[57] ABSTRACT

A flying insect eradicator includes a motor 11 centrally mounted in an open-ended cylindrical housing 10 and turning a fan blade 32 at one end and a rack 24 having upstanding teeth 23 at the other end. The rotating teeth 23 are interleaved with stationary teeth 21 depending from a fixed rack 20 to implement a chopping action on insects drawn through the device by the fan suction, and a cylindrical lamp 31 is provided to initially attract the insects.

7 Claims, 5 Drawing Figures

DEVICE FOR THE DESTRUCTION OF FLYING INSECTS, ESPECIALLY IN CLOSED ROOMS

The invention refers to a device for the destruction of flying insects, particularly in closed rooms, with a rotative hitting element which, within its range of action, fulminates flying insects.

Flying insects, which appear in closed rooms, are particularly flies and mosquitos. In consequence of the use of insect poisons in large proportions, especially of DDT, the apparition of the said flying insects in industrialized countries of the temperate climatic zones has been reduced substantially. DDT, during the last decade, has been gradually replaced by dimethyl dichlorovinyl phosphate (DDVP) which for the elimination of flying insects in enclosed spaces offers the advantage of evaporating rapidly and, as compared with DDT, of desintegrating in relatively harmless end products. However while its application for example in form of the known strips and other forms in living rooms and bedrooms seems to be innocuous for warm-blooded human and animal beings, its application, for example in residential kitchens and restaurants, is not recommendable because it is easily soluble in fats and therefore subject to absorbtion by alimentary products (food). In such places where flying insects are mainly aglommerating there is still the habit today to use such well known mechanical hitting devices like the known "flyslaps". As compared with the mentioned volatile insecticides these have no doubt the big advantage to be absolutely environment-friendly, but they require practically that each separate insect be chased after. Another disadvantage of the presently used volatile insecticides should be mentioned. In order to be sufficiently efficient, they require a determined minimum concentration for an enclosed space of a specific volume. This means however that such a space to be kept free of insects, has to be a "closed" space, i.e. doors and windows of a room dare only be opened very shortly and have to be closed immediately afterwards, in order to avoid that the in-streaming or through-streaming fresh air does not unduly reduce the concentration of the product in the room below the required limit. To keep windows and doors of such a room closed, particularly of a bedroom, however, is as much undesirable, for example, during hot summer nights in areas of colder climate than at any time in regions of sub-tropical or tropical climates.

The expedient to let the windows open but to provide them with fly-screens makes it difficult for flying insects like mosquitos to penetrate but on the other hand makes it practically impossible to simultaneously maintain an efficient concentration of volatile insecticide in this rather "enclosed" than closed room. Here again one has to chase some single insects, which were able to penetrate, with fly-slaps or, for example, a "FLIT" pump which means, of course, that to sleep without disturbance is impossible.

The object of the invention is therefore to realize an apparatus as initially described, which permits to destroy flying insects which penetrate in enclosed spaces like living rooms, bedrooms or kitchens, without causing any interruption of activity or of sleep to the persons present in the rooms and without detriment to the environment.

This task is being solved by a device for the destruction of flying insects, especially in enclosed spaces, by means of a rotative hitting element, through the range of action of which flying insects are hit and which is characterized as a hitting element formed by a rotative rack, which is mounted on the axes of the propelling motor; that the motor and the propulsion axes are mounted in a case which has preferably two opposite lying openings, in a way that the propulsion axes are placed in the center or middle of the case openings; that a transversal holder is provided above the open side of the case which the rotative rack is lying, and which carries a second, stationary rack, of which the teeth are placed in a gap between those of the first mentioned one and cooperate with the rack mounted on the propulsion axes for the purpose of hitting flying insects and that the case has a blade wheel, which is able to produce an air stream inside the case from one to the other case opening, through which flying insects are drawn into the range of action of the racks.

In addition a source of light is located in the case preferably in a way that it attracts flying insects into the range of action of both racks. Especially by night the source of light diffuses, for example when used in bedrooms, and is by preference some kind of light which is visible to flying insects but invisible to the human eye. It can be infrared or also ultra violet light. In the latter case it is preferable to provide the case with light screens in order to avoid that the eyes of human beings or animals, which happen to be nearby, be hurt.

The source of light is placed with preference inside the case between the pair of racks lying in one of the case openings on one side and the blade wheel on the other.

The support for the second stationary rack can be formed in a way to incorporate the bearing for one of the extremities of the propelling axes.

The blade wheel is placed with preference on the opposite extremity of the propelling axes, on which the first rack is fixed and this being near the case opening opposite to the pair of racks.

Between the source of light and the blade wheel neighbouring case opening it is of advantage to provide a light screen, which avoids light being expelled by the last named case opening. It could be disturbing, for example, in a bedroom. At least one of the two case openings will preferably be covered by a protecting grate.

Finally it is of advantage to provide a support, in which the case is fastened and by means of rotary axes can be fixed in any position.

Figure 2:
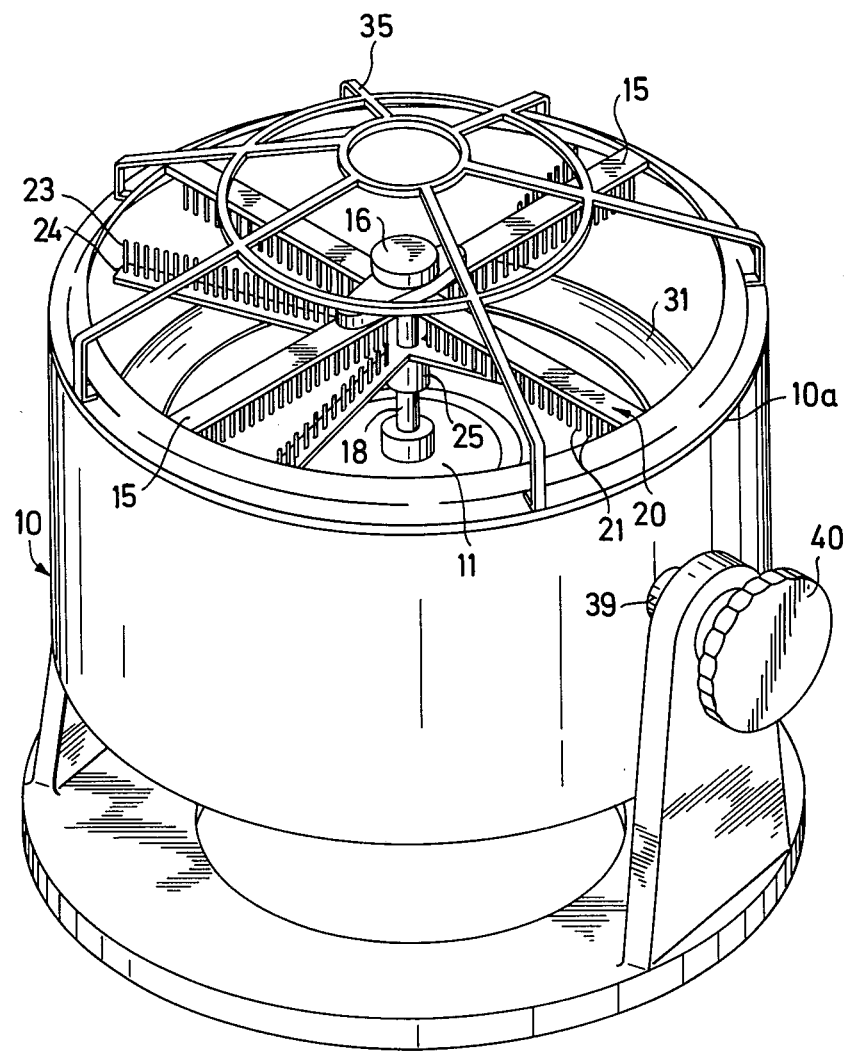
Figure 3:
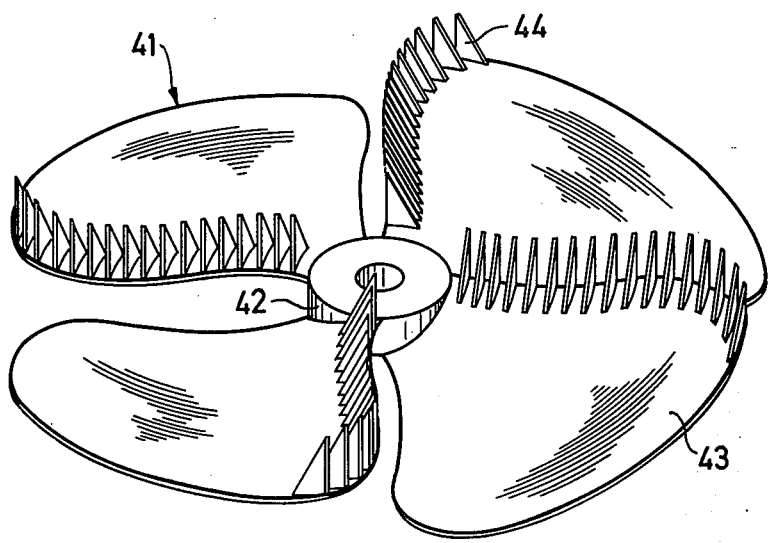
Figure 4:
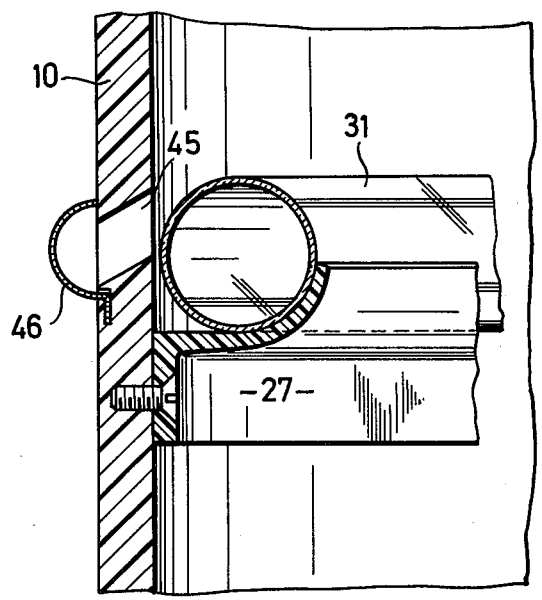
Figure 5:
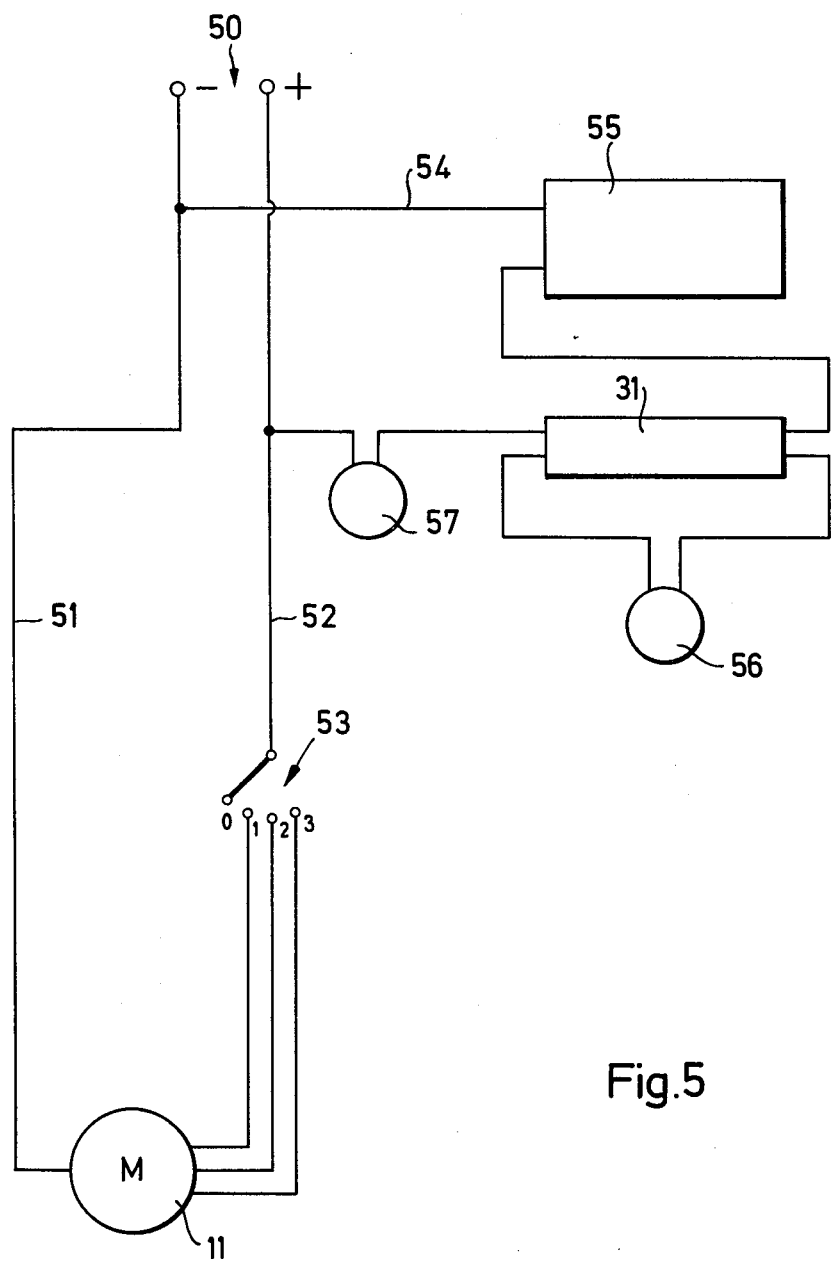

Additional details of the invention are deductable from the following description of a preferred form of execution of it and this in combination with the enclosed drawing. The latter demonstrates in:

FIG. 1 a vertical cut through a preferred form of execution of the device according to the invention;

FIG. 2 a perspective view of the device in the bounds of the case opening neighbouring the pair of racks;

FIG. 3 a preferred form of execution of the rack fastened on the motor's propelling axes;

FIG. 4 a schematic special provision for the elimination of the insects pieces and FIG. 5 a schematic description of the electric circuit of the device.

The insect destroying device according to the invention and as shown in FIGS. 1 and 2 embodies with preference a cylindric case 10, in which an electric motor 11 is mounted by means of a transversal arm 13 formed integral with the motor casing 12 and fixed with screws 14, and is fastened in such a way that the motor 11 is situated in about the middle zone of the case 10. On one open end of the case 10, a transversal support 15 is fastened on the front wall 10a. The support carries in its middle a bearing head 16 with a rotary bearing 17. In this bearing 17 works the extremity 18a of the propelling axes (shaft) 18 of the rotor 19 of the electric motor 11.

On the lower side of the transversal holder 15 a rack 20, serving as stationary hitting element, is fastened, of which the teeth 21 are placed in a gap between the teeth 23 of a rotative rack 24, which serves as a second moving hitting element. The rotative rack 24 through its fastening head 25 and the latter's fastening screw 26 is strongly fastened on the propelling shaft 18 extending itself to bearing 17 and rotating together with it.

Between rack 24 and electric motor 11, along the inner wall 30 of the cylinder, runs an annular shoulder 27, which is fastened to the case's inner wall 30 by means of screws 28 and on top of which lies a ring formed tubular lamp 31 which produces insect attracting light. The light from this source of light irradiates mainly through the case in the direction of the open end of the front wall 10a to the exterior, while the diffusion of light through the opposite opening of the case with the frontal wall 10b is cut or at least reduced by the annular shoulder 27 working mainly as a light screen.

In addition the propelling shaft 18, on its side running in the direction of the case opening with frontal side 10b, carries on its extremity 18b a blade wheel 32 working as ventilator, of which the hub 33 by means of a screw 34 is fastened on the shaft 18.

The shaft ending 18b can also work in a supporting or rotary bearing, which can be fastened on the front wall 10b of case 10.

In order to avoid any contact with the moving parts of the device during its operation, protecting grates 35 and 36 are mounted on both the front sides 10a and 10b of the case 10. The whole case with all the parts of the device previously described can be mounted on a support 37 by means of pins 38, 39 which permit its rotation and thanks to a wing nut or knob 40 can be fixed in any position.

The electric connections have been omitted in FIG. 1 by purpose so as not to affect its clearness.

FIG. 2 shows a view in perspective of the form of execution described in FIG. 1 and looking inside the device through the opening of the case on side 10a.

The rotative rack shown in FIGS. 1 and 2 can be substituted by the hitting element in propeller form 41 described in FIG. 3, which has a hub 42 for fastening to the shaft 18 and blades 43, of which each one carries hitting teeth 44 along its verge running from the hub to the outside.

Inasmuch as the parts of the fulminated insects are mainly projected by the centrifugal effect of rack 24 in the direction of the inner wall 30 of the case immediately above the tubular lamp 31, rather than in the direction of the central vertical axis of the case 10, it is of advantage, as shown in FIG. 4, to provide slits 45 along and through the wall immediately above the contact with tubular lamp 31, with down and outward inclination and which are covered on the outside by a basket like screen 46, where the parts of the insects are retained and which can be cleaned periodically.

FIG. 5, finally, describes the electric circuit of the device, on which the connection to the electric distribution system is specified with 50 and those to the motor 11 with 51 and 52, whereas connection 52 bears an interruptor 53 for motor 11. A sideline 54 runs through a reactor 55 and tubular lamp 31 respectively starter 56 and interruptor 57 back to 50.

After starting of the motor and when in operation an air current is being produced by the rotating ventilator 32 through the case in the direction of 10a to 10b. This air stream will be reinforced by the rotative rack 24 particularly when the preferred form of the blade wheel element 41 is used. As such the device works as a simple ventilator, although insects which are getting into the suction are, of course, being destroyed.

However, as from the moment the tubular lamp 31 starts irradiating when the interruptor 57 is being activated, larger amounts of insects will be attracted, mainly in darkness and fall into the suction of the fan and therefore destructed by the device. Killed or paralysed insects or the parts of destroyed insects will — as already explained — be projected mainly against the inner walling 30 and eliminated through the slits 45 without maculating the floor around the device.

During night operation it is recommended to place the device in a position where the propelling axes works in a vertical position so that the racks are upwards, the light does not disturb, while the light air stream caused by the fan will be felt comfortable during hot nights, when insects are particularly proliferating.

The case, both the hitting elements, the propeller and particularly the motor casing with its support should preferably be manufactured with plastic resins, because due to their reduced weight a relatively smaller electric motor, which works noiseless and is less power consuming, will be sufficient.

The preferred form of execution of the device has a cylindric case with an inner diameter of 21cm and a height of 15cm. The rotor is one of 50 Ha, which can be switched to three different rotations like 1000, 1500 and 2000 R/min.

The light source used is a ring formed black light tubular lamp of the type FCL/20 BL as manufactured by TOSHIBA of 20 watts. The respective reactor necessary for such a lamp is for example of the type GP 120B 116 (cos y 0,55; 0.39 A, 118 Volts by 60 Ha).

Experience has demonstrated that it is of particular advantage to have the teeth of the rotative rack exceed somewhat the level of the frontal verge 10a of case 10 in the direction of the outside. In this way the attracted insects are still easier to be hit.

Several modifications to the form of execution as shown in the drawings are possible. The propelling axes for example can run through the stationary rack in its middle, the teeth of which will therefore look from the case to the outside and the turning rack, with its own teeth directed to the interior of the case, can be fastened on the free standing extremity of the propelling shaft.

Also along the case wall, near the frontal side 10a a certain number of openings can be provided, through which the light can irradiate to the outside and to the side in order to attract also insects which happen to be more distant. These side openings can be closed by light screens in order to restrict especially by night the diffusion of light from the front side 10a of the case.

Especially effective in hitting the insects and to throw them into the interior of the case in the direction towards the blade wheel 32 is an arrangement where the teeth 21 and 23 are parallel to each other in planes which extend oblique to the longitudinal axes of the driving shaft 18, and also to the racks 20 and 24 (e.g. at an angle of 30, 45 or 6 degrees), the teeth being at the same time displaced relative to each other to bypass one another. In the embodiment of FIG. 3, the foot parts of teeth 44 are so arranged in a circular curve on the blades 43, that the teeth of the rotating rack will bypass without friction those of the stationary rack.

I claim:

1. An apparatus for destroying flying insects, comprising:
   a. a casing having an intake opening and an outlet opening at opposite ends thereof;
   b. a motor housed in said casing and having a shaft which extends between the two openings of the casing;
   c. a first rack of teeth mounted on the rotatable shaft of the motor;
   d. a second rack of teeth stationarily mounted across an opening of the casing and positioned such that the teeth of the first rack, when rotated, pass between the teeth of the second rack to effect a cooperative chopping action which destroys flying insects drawn between the racks; and
   e. a fan blade wheel mounted on the rotatable shaft of the motor for producing a current of air between the openings of the casing such that flying insects are drawn through said intake opening into the range of action of the racks,
   f. said first and second racks being located in said housing adjacent said intake opening of the casing, and
   g. said motor and fan blade wheel being mounted underneath said first and second racks with said fan blade wheel being located in the vicinity of said outlet opening and said motor being downstream of said first and second racks and upstream of said fan blade wheel.

2. An apparatus as defined in claim 1, further comprising basket-like means associated with the side wall of said casing downstream of said first and second racks, which basket means are adapted for retaining insect residues therein.

3. An apparatus as defined in claim 1, further comprising a bearing for said motor shaft and a support for said second rack, said bearing and support being integral.

4. An apparatus as defined in claim 3, further comprising a source of light housed in said casing and interposed between said first and second racks and said fan blade wheel.

5. An apparatus as defined in claim 4, further comprising a light screen for preventing radiation from said light source from reaching the outside of said casing through said outlet opening.

6. An apparatus as defined in claim 4, wherein the light emitted by said source is visible to flying insects but invisible to the human eye.

7. An apparatus as defined in claim 1, further comprising a support in which said casing is rotatably mounted and wherein means are provided for fixing said casing in a predetermined position relative to said support.

* * * * *